United States Patent
Zhao et al.

(10) Patent No.: US 7,403,677 B1
(45) Date of Patent: Jul. 22, 2008

(54) FIBEROPTIC RECONFIGURABLE DEVICES WITH BEAM SHAPING FOR LOW-VOLTAGE OPERATION

(75) Inventors: Jing Zhao, Winchester, MA (US); Jin Guanghai, Boxborough, MA (US); Shu Yongjun, Woburn, MA (US)

(73) Assignee: Agiltron, Inc., Woburn, MA (US)

( * ) Notice: Subject to any disclaimer, the term of this patent is extended or adjusted under 35 U.S.C. 154(b) by 151 days.

(21) Appl. No.: 11/216,434

(22) Filed: Aug. 30, 2005

Related U.S. Application Data (60) Provisional application No. 60/680,468, filed on May 11, 2005, provisional application No. 60/681,050, filed on May 16, 2005.

(51) Int. Cl.
G02B 6/26 (2006.01)
G02B 6/32 (2006.01)
G02F 1/03 (2006.01)

(52) U.S. Cl. .............................. 385/15; 385/33; 385/34; 385/35; 385/93; 359/245; 359/251; 359/252; 359/254; 359/255; 359/256; 359/257; 359/258; 359/315; 359/319; 359/322; 359/323

(58) Field of Classification Search ................ 359/245, 359/251, 252, 254–258, 315, 319, 322, 323; 385/15, 33–35, 93
See application file for complete search history.

(56) References Cited

U.S. PATENT DOCUMENTS

| | | | |
|---|---|---|---|
| 4,917,452 A | 4/1990 | Liebowitz | 350/96.15 |
| 5,144,471 A * | 9/1992 | Takanashi et al. | 359/245 |
| 5,305,136 A * | 4/1994 | Smith | 359/322 |
| 6,137,619 A | 10/2000 | Chen et al. | 359/251 |
| 6,330,097 B1 | 12/2001 | Chen et al. | 359/239 |
| 6,404,538 B1 | 6/2002 | Chen et al. | 359/323 |
| 6,415,069 B1 * | 7/2002 | Chao et al. | 385/33 |
| 6,542,665 B2 | 4/2003 | Reed et al. | 385/34 |
| 6,757,101 B2 | 6/2004 | Jin et al. | 359/484 |
| 6,839,483 B2 | 1/2005 | Reed et al. | 385/28 |
| 6,839,485 B2 | 1/2005 | Gardner et al. | 385/33 |
| 6,873,768 B2 | 3/2005 | Duelli et al. | 385/50 |
| 6,890,874 B1 | 5/2005 | Li et al. | 501/134 |
| 6,893,170 B1 * | 5/2005 | Edwards et al. | 385/93 |
| 2002/0094162 A1 | 7/2002 | Li et al. | 385/34 |
| 2002/0136482 A1 | 9/2002 | Zhang | 385/16 |
| 2003/0021531 A1 | 1/2003 | Brophy et al. | 385/33 |

* cited by examiner

*Primary Examiner*—Evelyn A. Lester
(74) *Attorney, Agent, or Firm*—Burns & Levinson LLP; Jacob N. Erlich; Thomas P. Grodt (57) ABSTRACT

An apparatus and method to operate on a light beam by using a lens that collimates the light beam to a collimated beam with at least one cross-sectional dimension less than a critical dimension of 400 μm or less over a working range WR. The apparatus has a bulk electro-optic material of small thickness τ, e.g., less than 300 μm positioned within working range WR and the collimated beam traverses it along its path. The apparatus has a voltage source for applying a low operating or drive voltage $V_{drive}$, e.g. less than 400 V to the bulk electro-optic material for performing an operation on the collimated beam. The lens for collimating the light beam is a free-space collimator such as a graded index (GRIN) lens or preferably a C-lens. The apparatus is a versatile and scalable platform that can be employed in building various electro-optic devices.

28 Claims, 5 Drawing Sheets

FIBEROPTIC RECONFIGURABLE DEVICES WITH BEAM SHAPING FOR LOW-VOLTAGE OPERATION

RELATED APPLICATIONS

This patent application claims priority to U.S. Provisional Patent applications 60/680,468 filed on May 11, 2005 and 60/681,050 filed on May 16, 2005, which are hereby incorporated by reference.

FIELD OF THE INVENTION

This invention relates generally to reconfigurable optical devices such as switches, variable splitters, variable attenuators and other devices in which port-to-port coupling properties are controlled.

BACKGROUND ART

Electrically reconfigurable optic devices direct optical signals along selected fibers, or control optical signal intensity within a fiber link, or select wavelength band of an optic network in which light signals are transmitted along optical fibers to transfer information from one location to another. Optical devices of this type should have the following performance characteristics: high speed operation, low optical insertion loss, high reliability, low power consumption, easy to drive, and low cost to produce. Although reconfigurable optical devices become increasingly important in today's optical networks, they have not been widely adopted because of their poor optical performance and complex control requirements.

Reconfigurable optical devices are dominated by those with mechanical switching mechanisms, due to their low cost and good optical performance of low loss and little signal distortion. Unfortunately, these switches are slow and not sufficiently reliable.

Non-mechanical, solid-state optical, switches are more desirable due to their intrinsic high speed operation and excellent reliability as well as low power consumption. Many non-mechanical configurations have been reported based on mechanisms such as liquid crystal polarization rotation, thermal heating induced optical birefringence change, magneto-optic polarization rotation, and electro-optic retardation that changes either optical phase or polarization. For additional background on such switches that use organic liquid crystals the reader is referred to U.S. Pat. No. 4,917,452. Further information on the use of ceramic materials in such switches is taught in U.S. Pat. Nos. 6,330,097; 6,757,101.

Among these methods, devices based on inorganic electro-optic crystals are most desirable, since this class of materials has the highest operation speed know to date. One example is $LiNbO_3$ that has a high Curie temperature near 2000° C., making it a highly stable electro-optic material of choice for practical applications. However, a straightforward application of electro-optic crystals in conventional device configurations lead to the requirement of excessively high driving voltages well over several thousand volts, rendering it impractical. Diffusion based $LiNbO_3$ waveguide technologies have been developed that reduce the driving voltage significantly. Also, the use of selective domain poled electro-optic materials, such as $LiNbO_3$ wafer to reduce drive voltage to about 700 V is found in U.S. Published Application 2002/0136482. However, the planar waveguide platform inherently has high polarization sensitivity and operation bias drift. Both of these issues have to be dealt with using difficult schemes, and the fundamental mode miss-match with the fiber generates unacceptable large insertion loss.

U.S. Pat. Nos. 6,137,619 and 6,404,538 both to Chen et al. teach a high-speed electro-optic modulator that uses a ceramic material that exhibits a large electro-optic effect and is coupled with conventional fiber collimators. Due to its low Curie temperature, the electro-optic ceramic material exhibits instabilities such as large temperature dependence and large hysteresis, consequently requiring complex compensation or feedback control. Moreover, the switching times of devices using such material are often limited to several microseconds due to polycrystalline material structure, thus limiting the applications of such devices.

Further prior art teachings concentrate on other aspects of the optics in electro-optic devices to improve their performance. For example, U.S. Pat. Nos. 6,542,665 and 6,839,483 both to Reed et al. teaches the uses of GRIN lenses for collimating down to a beam diameter D on the order of fiber diameter 125 μm over a longer Raleigh range. U.S. Pat. No. 6,873,768 to Duelli et al. teaches fiber terminations to form a microlenses and achieve good collimation and/or focusing to thus extend the working distance with the minimum spot size (or beam diameter D) for free space interconnects and other devices. Still other teachings regarding working distances and optics can be found in U.S. Pat. Nos. 6,890,874; 6,839,485 and U.S. Published Applications 2002/0094162 and 2003/0021531.

Unfortunately, none of the prior art teaches or points the way to an apparatus that can use electro-optic materials to operate on beams efficiently and with low loss. Therefore, a micro-optic platform that overcomes these deficiencies and the deficiencies associated with waveguides, as discussed above, would be of significant commercial value and represent an advance in the art for electrically controllable fiberoptic devices.

OBJECTS AND ADVANTAGES

In view of the above prior art limitations, it is an object of the invention to provide an electro-optic device that can use bulk electro-optic materials to perform efficient, low-loss operations on light beams at low drive voltages. In particular, it is an object of the invention to provide electro-optic devices that can employ highly stable bulk electro-optic crystals rather than unstable ceramics.

It is another object of the invention to provide electro-optic devices that use inexpensive lenses and low drive voltages and satisfy the requirements for light beam operations required for optical circulators, reciprocal devices, polarization rotators, beam retarders, beam attenuators, beam deflectors, electro-optic switches and the like.

It is still another object of the invention to provide for electro-optic devices that are compatible with standard fiber optics.

These and other objects and advantages of the invention will become apparent from the ensuing description.

SUMMARY OF THE INVENTION

The objects and advantages of the invention are secured by a method and an electro-optic apparatus that operates on a light beam by using a lens that collimates the light beam to a collimated beam such that at least one cross-sectional dimension of the collimated beam is less than a critical dimension over a working range WR. The apparatus has a bulk electro-optic material positioned within working range WR. The bulk electro-optic material has a small thickness τ that the collimated beam traverses on its path. The apparatus also has a voltage source for applying an operating or drive voltage $V_{drive}$ to the bulk electro-optic material for performing an operation on the collimated beam.

The lens for collimating the light beam is preferably a free-space collimator such as a graded index (GRIN) lens or C-lens. It most embodiments it is rod shaped for easy collimator construction. The lens is designed to achieve a critical dimension in the cross-section of collimated beam of approximately 300 μm or less. With such small critical dimension collimated beam can be operated on by bulk electro-optic material that typically require high drive voltages at drive voltages $V_{drive}$ that are 400 V or less.

The apparatus of invention allows the user to take advantage of highly stable bulk electro-optic materials with high Curie temperatures other than low Curie temperature poor stability electro-optic materials such as $BaTiO_3$ or ceramics. In particular, the bulk electro-optic material can be an electro-optic crystal such as $LiNbO_3$, KTP, $LiTaO_3$, RTP, KDP, KD*P, BBO, $KnbO_3$, $KTa_xNb_{1-x}O_3$. Alternatively, the bulk electro-optic material can be selected from the group of materials including PNZ, PLZT, PMN, PMN-PT. Embodiments employing the latter materials preferably employ a compensation driving circuit for compensating thermal effects and other fluctuations.

The apparatus of invention can be employed in making various electro-optic devices. The behavior of the single crystal bulk electro-optic material can be employed for walking off different polarizations of light, rotating them and for performing other functions on one or more collimated beams. Thus, the electro-optic device can be a circulator, reciprocal device, polarization rotator, beam retarder, high speed variable optical attenuator, variable optical beam splitter, beam deflector or an electro-optic switch.

The method of invention allows the user to operate on one or more light beams in an electro-optic device. In operating on any light beam, the method calls for collimating that light beam to obtain a collimated beam that has a working range WR within which at least one cross-sectional dimension of the collimated beam is substantially less than a critical dimension. The critical dimension is approximately 400 μm or less. The method further calls for positioning the bulk electro-optic material having a small thickness τ within working range WR and performing the operation on the collimated beam by applying a drive voltage $V_{drive}$ to the bulk electro-optic material. Because of the small critical dimension the drive voltage can be less than 400 V and thickness τ about 300 μm while achieving efficient device operation.

A detailed description of the preferred embodiments of the invention is presented below in reference to the appended drawing figures.

DETAILED DESCRIPTION

Figure 1:
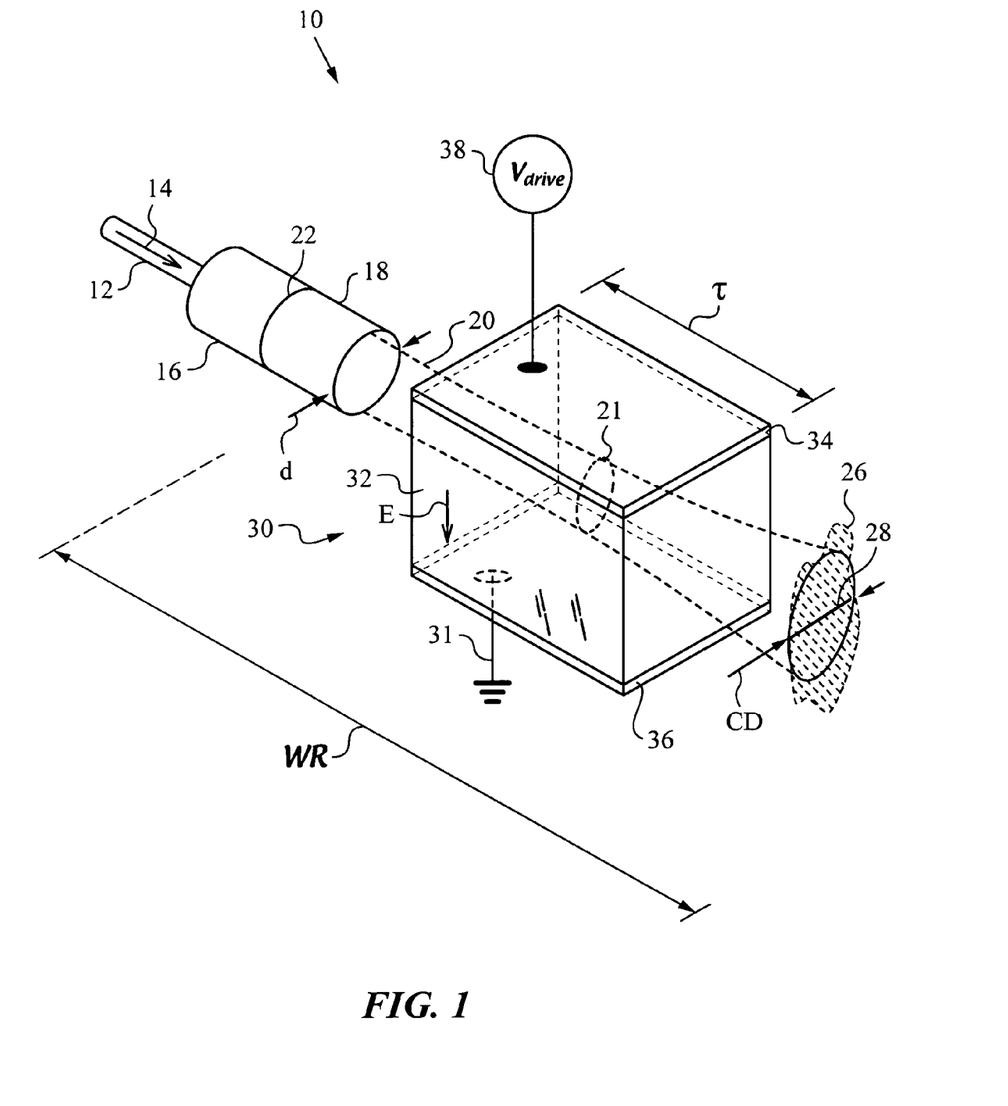
FIG. 1 is a three-dimensional diagram illustrating the basic principles of an apparatus in accordance with the invention.

The present invention will be best understood by first reviewing the principles of the invention as illustrated in a portion of an electro-optic apparatus 10 shown in FIG. 1. Apparatus 10 is designed to interface with a fiber 12 that guides a light beam 14. Fiber 12 is received in a coupling unit or ferrule 16 that has a central bore (not shown) for retaining fiber 12. A person skilled in the art will recognize that ferrule 16 is only one of many possible ways of receiving a fiber and that other suitable ways and devices can be used for this purpose.

Apparatus 10 has a lens 18 for collimating light beam 14 to a collimated beam 20. Lens 18 is a graded index (GRIN) lens or preferably a curved surface lens or C-lens. To ensure good optical coupling between fiber 12 and lens 18, an interface 22 between ferrule 16 and lens 18 should be polished at an angle of a few degrees. This is just one of the methods that a person skilled in the art will be familiar with, and it should be noted that any other suitable method can be employed.

In contrast to prior art lenses, lens 18 is a free-space collimator lens in the form of a rod with significantly reduced diameter 24. Diameter 24 is smaller than 1 mm and preferably less than 300 μm. Now, it is know in the art that fiberoptic collimators of such small size do not collimate light uniformly over the entire free-space propagation region. In fact, lens 18 is a non-uniform collimator. In the present invention, however, lens 18 is designed such that it shapes light beam 14 or, more precisely, collimates light beam 14 to ensure that collimated beam 20 has a non-uniform cross section 26 of a special type. In particular, cross-section 26 is such that at least one cross-sectional dimension 28 remains less than a critical dimension CD over a working range WR of lens 18. According to the invention, critical dimension CD in cross-section 26 of collimated beam 20 is set at 400 μm or less. Working range WR or working distance is defined as twice the distance from lens 18 to the location of smallest beam waist 21 in collimated beam 20.

Apparatus 10 has an electro-optic element 30 that employs a bulk electro-optic material 32. Element 30 is positioned within working range WR. Material 32 has a small thickness τ that collimated beam 20 traverses on its path. In accordance with the invention, thickness τ is 300 μm or even less. Element 30 has a top electrode 34 and a bottom electrode 36. A voltage source 38 is connected across electrodes 34, 36 for applying an operating or drive voltage $V_{drive}$ to material 32. In this embodiment, electrodes 34, 36 are configured to generate an electric field E that is transverse to the direction of propagation of collimated beam 20 and electrode 36 is grounded at common or ground 31. Voltage source 38 may be a part of a larger circuit, e.g., a driving circuit adapted for a specific application and choice of material 32.

Lens 18 and its beam shaping or collimation characteristics allows one to use material 32 that typically requires high drive voltage $V_{drive}$. In particular, such small critical dimension CD, i.e., below 400 μm in cross-section 26 of collimated beam 20 permits use of material 32 that typically requires drive voltage $V_{drive}$ that is well in excess of 500 V for efficient operation. In other words, apparatus 10 allows the user to take advantage of highly stable bulk electro-optic materials with high Curie temperatures rather than ceramics while allowing drive voltage $V_{drive}$ to be significantly below 500 V and preferably below 400 V. Material 32 can thus be an electro-optic crystal such as lithium niobate (LiNbO$_3$), potassium titanyl phosphate (KTP or KTiOPO$_4$), lithium tantalate LiTaO$_3$, rubidium titanyl phosphate (RTP or RTiOPO$_4$), potassium dihydrogen phosphate (KDP), potassium dideuterium phosphate (KD*P), BBO, KnbO$_3$, KTa$_x$Nb$_{1-x}$O$_3$. Alternatively, material 32 can be selected from the group of materials including lead niobate zirconate (PNZ), lanthanum modified PZT (PLZT), lead manganese niobate PMN, and a solid solution of lead manganese niobate and lead tantalite (PMN-PT). It should be noted that additional members in the second group of materials are likely to be uncovered in the future. One should also note, that embodiments employing materials from the second group preferably have a compensation driving circuit for compensating thermal effects and other fluctuations, as discussed below.

During operation, drive voltage V$_{drive}$ is applied and the electric field E generated thereby causes the polarization of collimated beam 20 to be rotated. Of course, thanks to the small thickness τ and low drive voltage V$_{drive}$, this rotation is performed efficiently over a small distance. Alternatively, if electrodes 34, 36 are positioned to generate a field gradient along the path of collimated beam 20, then the application of drive voltage V$_{drive}$ will cause collimated beam 20 to be deflected by a certain angle from its original path, as if it passed through a wedge. The effects of applying voltages to material 32 are well-known to a person skilled in the art will not be discussed in detail herein. Instead, the reader is referred to the textbook by Amnon Yariv, *Introduction to Optical Electronics*, Holt, Reinhart&Winston, copyright 1976 for more information.

The apparatus of invention can be employed in making various electro-optic devices. The non-linear behavior of the bulk electro-optic material can be employed for walking off different polarizations of light, rotating them and for performing other functions on one or more collimated beams. Thus, the electro-optic device can be a circulator, reciprocal device, polarization rotator, beam retarder, high speed variable optical attenuator, variable optical beam splitter, beam deflector, electro-optic switch or other device that employs the apparatus of invention in any portion or subassembly. The careful optic design involved in selecting the working range WR and critical dimension CD enables devices that achieve low optical loss even when passing through multiple optical elements, including electro-optic materials placed within the working range WR. This permits the use of electro-optic crystals of small thickness τ even less than 300 mm that in turn reduce the drive voltage V$_{drive}$ necessary to operated the device below 400 V. The present apparatus thus forms a base for a new family of electro-optic reconfigurable fiberoptic devices with low drive voltages, making them practical for many applications. A significant advantage of this approach is its fast switching time of less than 10 ns in a low cost simple construction.

Figure 2:
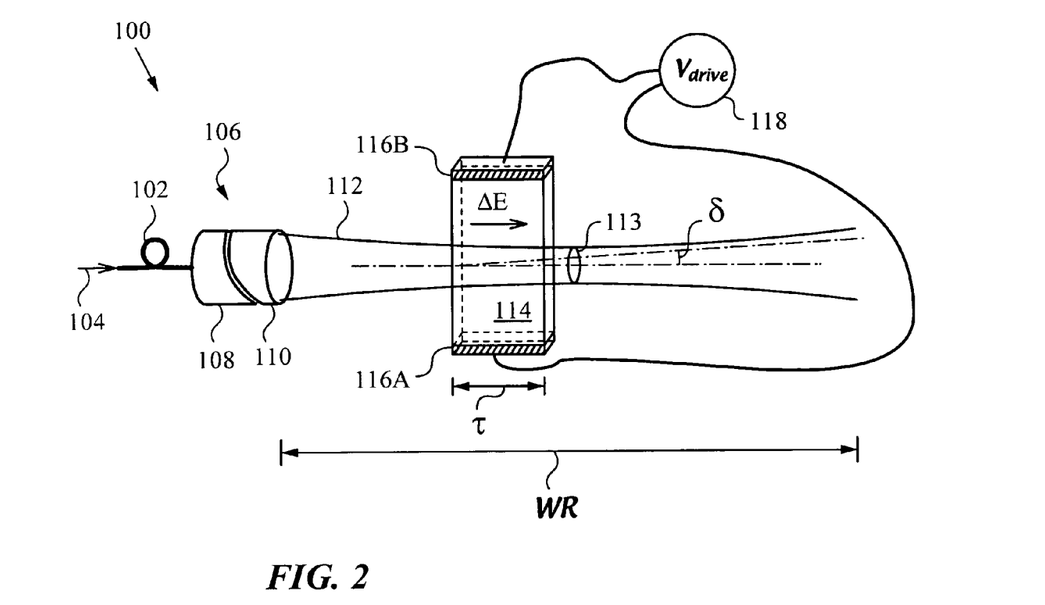
FIG. 2 is a side view of a high speed, electrically variable optical attenuator in accordance with the invention.

A person skilled in the art will recognize that the apparatus and method of invention embodies a highly versatile and novel platform that can be implemented in a wide variety of electro-optic devices. For example, FIG. 2 illustrates in side view a high speed, electrically variable optical attenuator 100 according to the invention. Attenuator 100 has a fiber 102 for guiding a light beam 104 to an input port 106. Port 106 has a ferrule 108 and a collimating lens 110. Lens 110 collimates light beam 104 to a collimated beam 112 having a working range WR that is equal to twice the distance from lens 110 to the smallest beam waist 113. The collimation is performed in accordance with the invention such that at least one cross-sectional dimension of collimated beam 112 is less than critical dimension CD over working range WR.

An electro-optic bulk crystal 114 having a thickness τ less than 300 μm is placed within working range WR of collimated beam 112. Two electrodes 116A, 116B are placed on crystal 114 for generating a electrical field E that exhibits a gradient along the path of collimated beam 112. A source 118 is provided for applying a drive voltage V$_{drive}$ to electrodes 116A, 116B.

Attenuator 100 is operated by applying drive voltage V$_{drive}$ to electrodes 116A, 116B. This causes collimated beam 112 to be deflected by a deflection angle δ from its original path due to the field gradient. This effect is similar to passing through an optical wedge. Therefore, attenuator 100 operates as an electrically controllable light beam deflector and its attenuation property is achieved by altering the coupling of collimated beam 112 into follow-on elements (not shown) as a function of deflection angle δ. With electrodes 116A, 116B generating a uniform electric field E perpendicular to the path of collimated beam 112, attenuator 100 will rotate the polarization of collimated beam 112. Therefore, attenuator 100 can operate as an electrically controllable polarization rotator and its attenuation property is achieved by altering the coupling of collimated beam 112 into follow-on elements (not shown) as a function of polarization rotation. Thus, in general, device 100 is an electrically controllable fiberoptic light beam retarder or polarization rotator.

Figure 3:
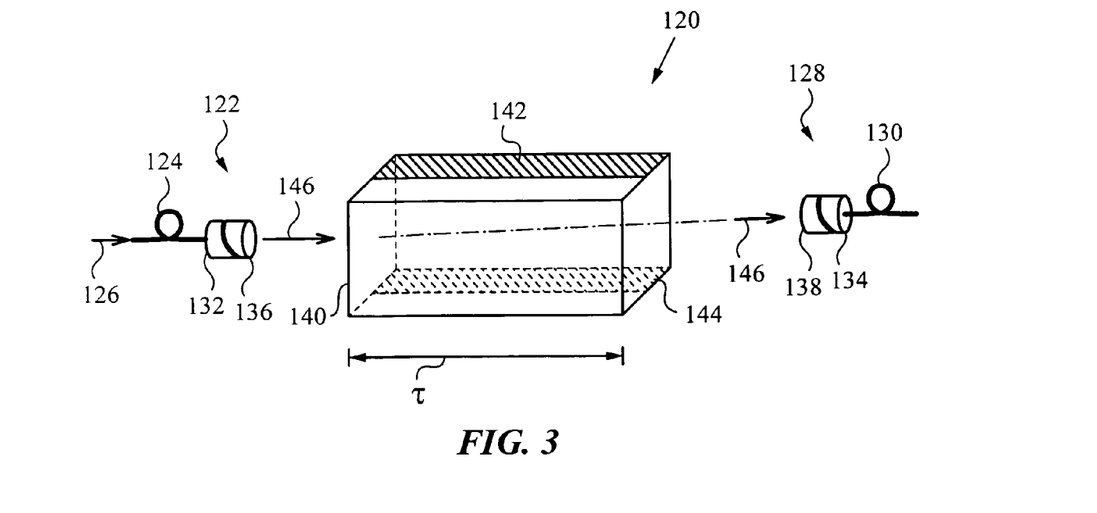
FIG. 3 is a side view of an electrically variable fiberoptic attenuator in accordance with the invention.

FIG. 3 is a side view of another electrically variable fiberoptic attenuator 120 designed in accordance with the invention. Attenuator 120 is equipped with an input port 122 for receiving a first or input fiber 124 that delivers a light beam 126. An output port 128 for a second or output fiber 130 is provided opposite input port 122. Ports 122, 128 both use ferrules 132, 134 and C-lenses 136, 138. A bulk electro-optic crystal 140 of thickness τ that is less than 300 μm is positioned between ports 136, 138. Two electrodes 142, 144 are attached to crystal 140 for applying to it a drive voltage V$_{drive}$ from a source (not shown).

During operation, port 122 receives light beam 126 and C-lens 136 collimates it in accordance with the invention over a working range WR to below a critical dimension CD to produce a collimated beam 146. The application of drive voltage V$_{drive}$ to electrodes 142, 144 controls the amount of deflection of collimated beam 146 by creating a birefringent wedge.

Consequently, the amount of intensity or power that is in-coupled at port 128 varies as a function of drive voltage V$_{drive}$. Thus, device 120 functions as an electrically variable fiberoptic attenuator. Note that in this embodiment the collimation properties of C-lenses 136, 138 are matched for ensuring good coupling properties of collimated beam 146.

Figure 4:
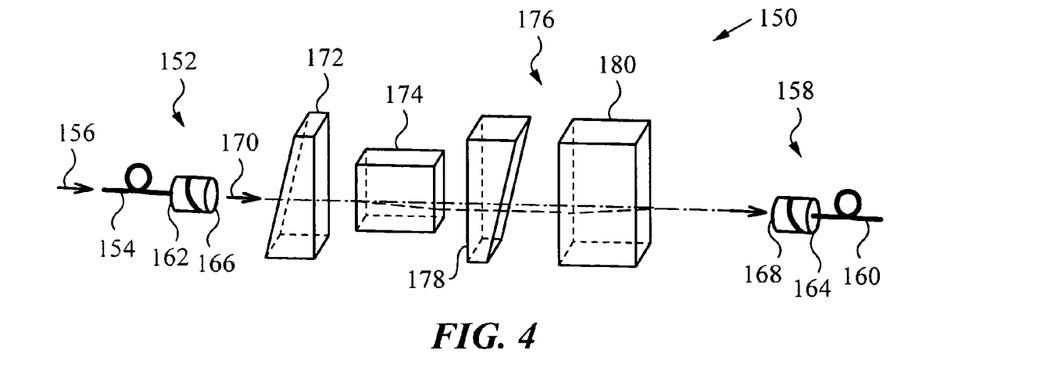
FIG. 4 is a side view of another electrically variable fiberoptic attenuator in accordance with the invention.

FIG. 4 illustrates a polarization independent electrically variable fiberoptic attenuator 150 according to the invention. Attenuator 150 has an input port 152 for an input fiber 154 delivering a light beam 156 and an output port 158 for an output fiber 160. As above, ports 152, 158 use ferrules 162, 164 and matched C-lenses 166, 168. Lens 166 is designed in accordance with the invention to produce a collimated beam 170 that preserves a critical dimension CD of less than 400 μm over working range WR.

Attenuator 150 has a polarization beam splitter 172 in the form of a birefringent wedge. A bulk electro-optic material 174 is placed after splitter 172 for walking off the orthogonal polarizations of collimated beam 170. Material 174 is followed by a compound beam combiner 176 including a wedge 178 and a birefringent crystal 180 configured to recombine the orthogonal polarizations walked off by material 174.

Figure 5:
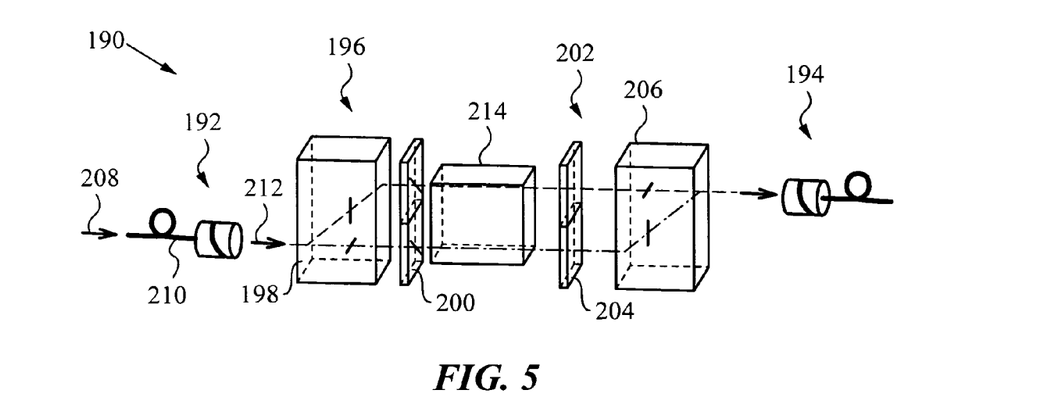
FIG. 5 is a side view of yet another electrically variable fiberoptic attenuator in accordance with the invention.

Because of the collimation of beam 170, material 174 can have a small thickness τ, e.g., less than 300 μm, and be operated efficiently with a low drive voltage, e.g., less than 400 V. Still another electrically variable fiberoptic attenuator 190 is shown in FIG. 5. The input and output ports 192, 194 are configured as in the above embodiments. Attenuator achieves polarization independence by using a compound polarization beam splitter 196 consisting of a birefringent element 198 and a polarization rotator 200 and a compound beam combiner 202 consisting of a polarization rotator 204 and a birefringent element 206.

Attenuator 190 receives a light beam 208 from a fiber 210 through its input port 192. The C-lens of input port 192 produces a collimated beam 212 in accordance with the invention. A bulk electro-optic material 214 for operating on collimated beam 212 is positioned within the working range WR of collimated beam 212 and between compound splitter 196 and combiner 202.

Figure 6:
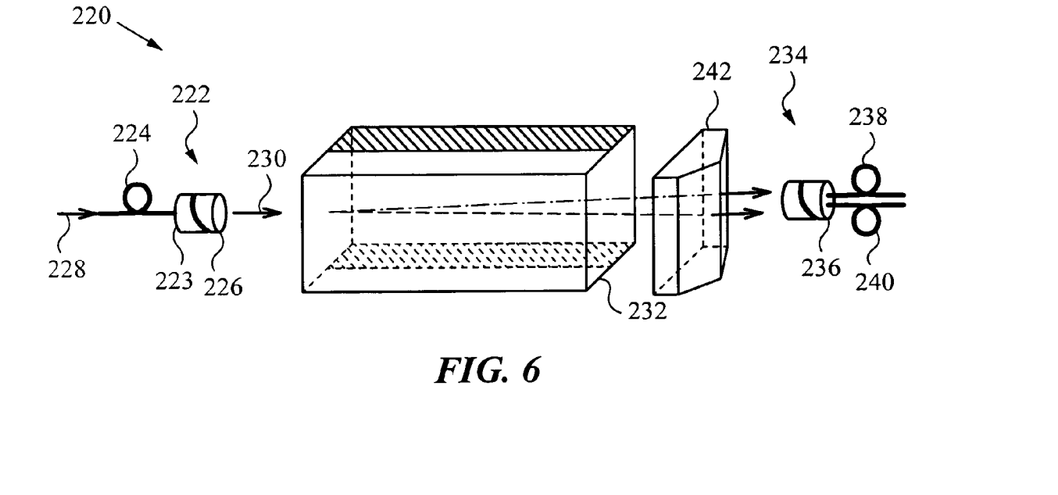
FIG. 6 is a side view of an optical 1×2 variable fiberoptic splitter or switch in accordance with the invention.

FIG. 6 illustrates an optical 1×2 variable fiberoptic splitter or switch device 220. Device 220 is analogous in construction to attenuator 120 of FIG. 3 in that it has an input port 222 with a ferrule 223 for an input fiber 224, a C-lens 226 for collimating a light beam 228 to produce a collimated beam 230, and electro-optic material 232 for operating on collimated beam 230. In contrast to attenuator 120, however, an output port 234 has a ferrule 236 for accepting two output fibers 238, 240. A beam correction element 242 in the form of a prism is also used to ensure proper in-coupling of collimated beam 230 produced by a C-lens 226 into either output fiber 226 or 228. The operation of device 220 in switch or variable splitter mode is determined by the magnitude of drive voltage $V_{drive}$.

Figure 7:
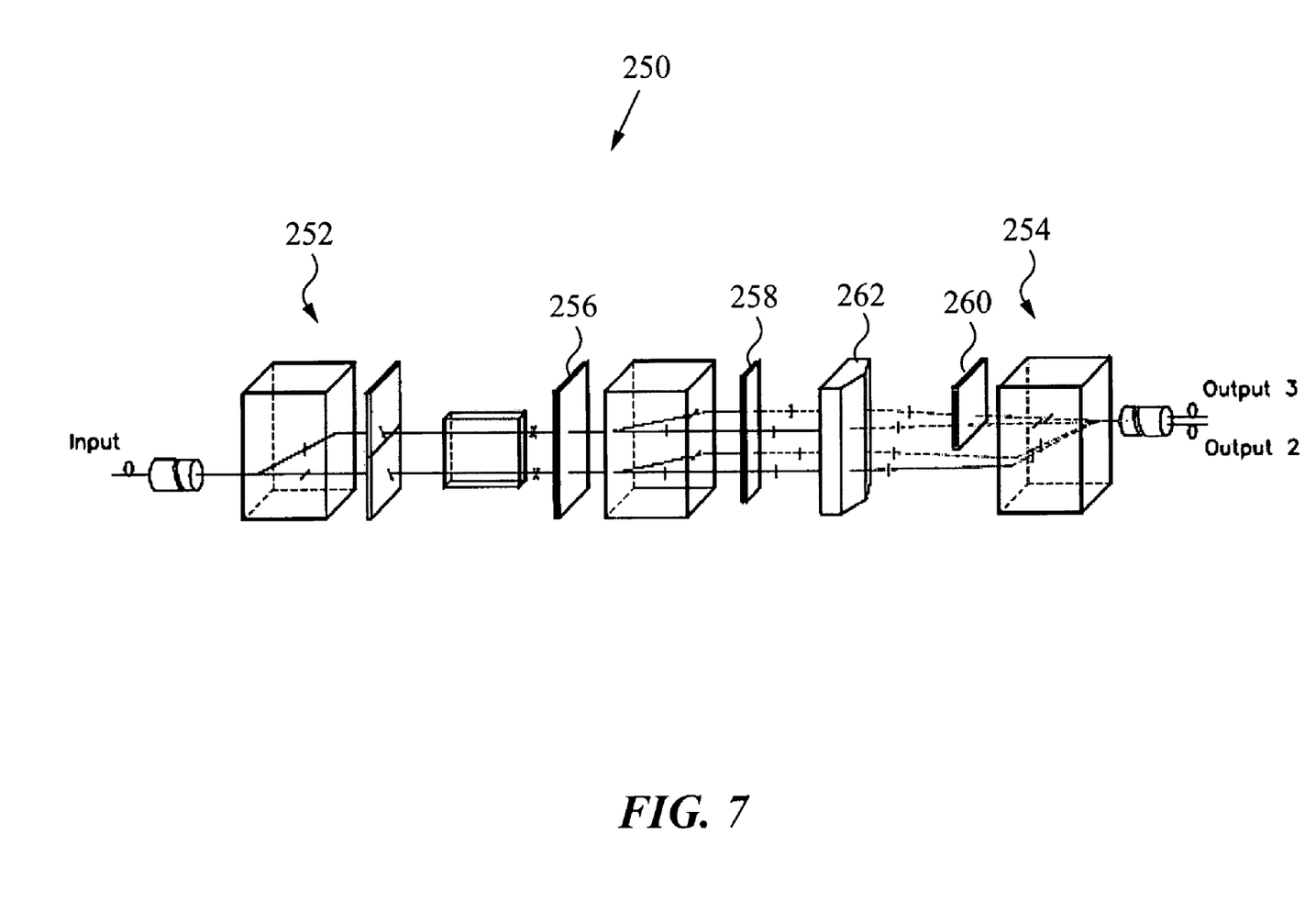
FIG. 7 is a side view of another optical 1×2 variable fiberoptic splitter or switch in accordance with the invention.
Figure 8:
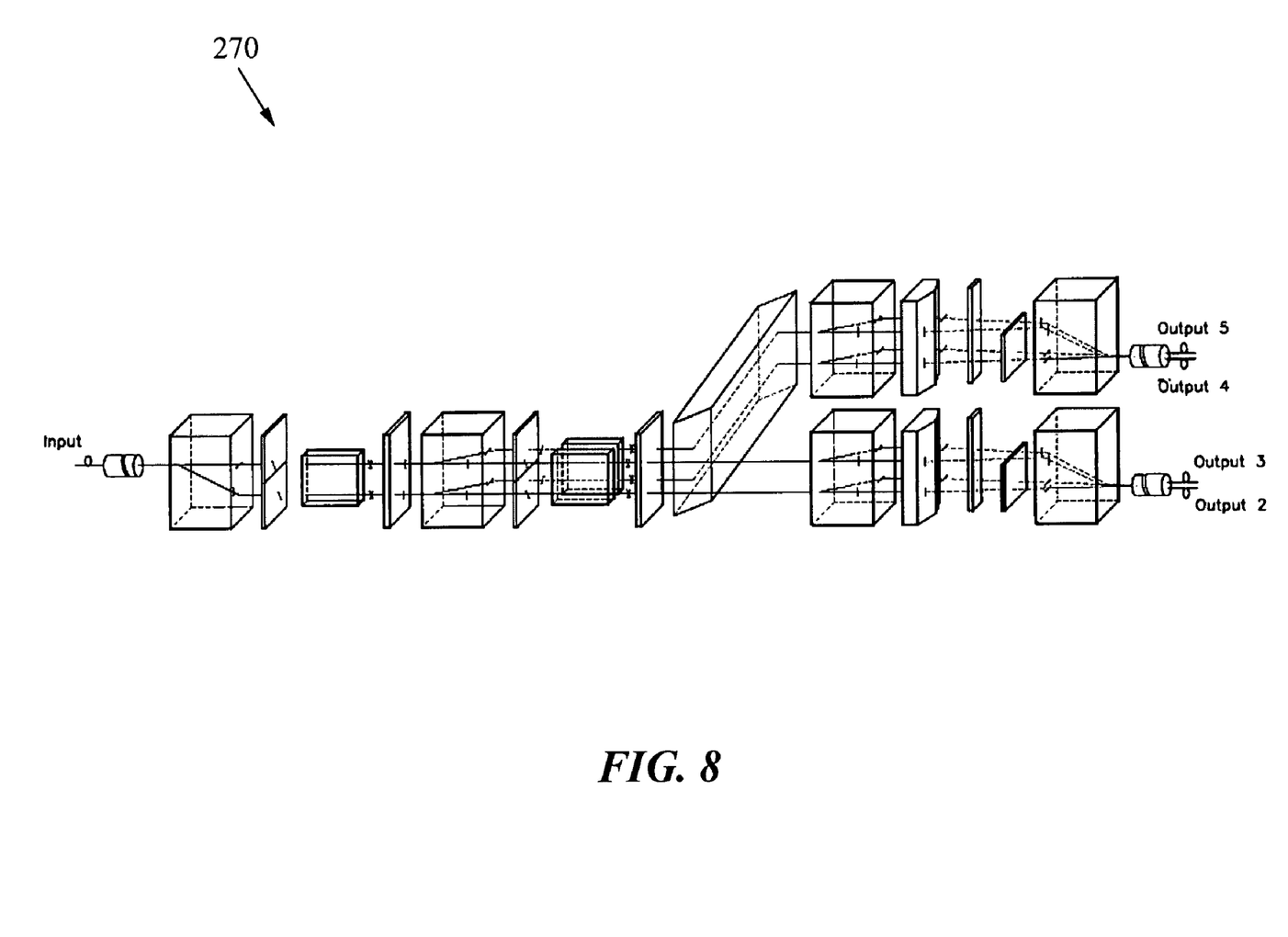
FIG. 8 is a side view of an optical 1×4 optical switch employing the apparatus of invention.

FIG. 7 is a side view of another device 250 in accordance with the invention. Device 250 can function as an optical 1×2 variable fiberoptic splitter or as a switch. Device 250 employs a compound polarization beam splitter 252, a beam combiner 254, half wave plates 256, 258, 260 and an angle correction prism 262. FIG. 8 illustrates how the same principles can be employed to produce a device 270 that can function as a free-space 1×4 electro-optic switch.

Clearly, the apparatus and method of invention are highly scalable and other embodiments of the apparatus and method are possible. Therefore, the scope of the invention should be judged by the appended claims and their legal equivalents.

We claim:

1. An electro-optic apparatus for operating on a light beam, said electro-optic apparatus comprising:
   a) a lens for collimating the light beam to a non-uniform collimated beam having a cross sectional dimension that has a portion thereof that is equal to or less than a critical predetermined dimension within a working range WR, said working range being substantially twice the distance between said lens and said portion;
   b) a bulk electro-optic material positioned within said working range WR and having a thickness τ;
   c) a voltage source for applying a drive voltage $V_{drive}$ to said bulk electro-optic material for performing an operation on said non-uniform collimated beam;
   d) an optical fiber for guiding the light beam; and
   e) a ferrule having a central bore for retaining said optical fiber guiding the light beam, said ferrule disposed adjacent to said lens to form an interface between said optical fiber and said lens.

2. The electro-optic apparatus of claim 1, wherein said lens comprises a free-space collimator.

3. The electro-optic apparatus of claim 2, wherein said free space collimator is selected from the group consisting of C-lens and graded index lens.

4. The electro-optic apparatus of claim 2, wherein said free-space collimator has a diameter substantially equal to or less than 300 μm.

5. The electro-optic apparatus of claim 1, wherein said critical predetermined dimension is equal to or less than 400 μm.

6. The electro-optic apparatus of claim 1, wherein said bulk electro-optic material is an electro-optic crystal selected from the group consisting of $LiNbO_3$, KTP, $LiTaO_3$, RTP, KDP, KD*P, BBO, $KnbO_3$, and $KTa_xNb_{1-x}O_3$.

7. The electro-optic apparatus of claim 1, wherein said bulk electrooptic material is a bulk material selected from the group consisting of PNZ, PLZT, PMN, and PMN-PT.

8. The electro-optic apparatus of claim 1, further comprising a driving circuit.

9. The electro-optic apparatus of claim 1, wherein said lens is a non-uniform collimating lens.

10. The electro-optic device of claim 9 wherein said non-uniform collimating lens is a a free-space collimator lens in the shape of a rod.

11. The electro-optic apparatus of claim 1, wherein said non-uniform collimated beam has a direction of propagation through said bulk electro-optic material and wherein said voltage source for applying the drive voltage $V_{drive}$ to said bulk electro-optic provides an electric field within said electro-optic bulk material that is transverse to the direction of propagation of the non-uniform collimated beam.

12. The electro-optic apparatus of claim 11 wherein said non-uniform collimated beam has a polarization within said bulk electro-optic material and wherein said electric field within said electro-optic bulk material is operative to rotate said polarization of said non-uniform collimated beam.

13. The electro-optic apparatus of claim 1, wherein said non-uniform collimated beam has a direction of propagation through said bulk electro-optic material and wherein said voltage source for applying a drive voltage $V_{drive}$ to said bulk electro-optic provides an electric field within said electro-optic bulk material that has a field gradient along the direction of propagation of the non-uniform collimated beam.

14. The electro-optic apparatus of claim 13 wherein said non-uniform collimated beam has a direction of propagation within said bulk electro-optic material and wherein said field gradient within said electro-optic bulk material is operative to deflect said direction of propagation of said non-uniform collimated beam.

15. An electro-optic device comprising:
   a) a lens for receiving and collimating a light beam to a non-uniform collimated beam having a cross-sectional dimension that has a portion thereof that is equal to or less than a critical predetermined dimension within a working range WR, said working range being approximately twice distance between said lens and said portion;
   b) a bulk electro-optic material positioned within said working range WR and having a thickness τ;
   c) an optical fiber for guiding the light beam; and
   d) a ferrule having a central bore for retaining an said optical fiber, said ferrule disposed against adjacent to said lens to define form an interface between said optical fiber and said lens.

16. The electro-optic device of claim 15, wherein said lens comprises a free-space collimator.

17. The electro-optic device of claim 16, wherein said free space collimator is selected from the group consisting of C-lens and graded index lens.

18. The electro-optic device of claim 16, wherein said free-space collimator has a diameter substantially equal to or less than 300 μm.

19. The electro-optic device of claim 15, wherein said critical predetermined dimension is substantially equal to or less than 400 μm.

20. The electro-optic device of claim 15, wherein said bulk electro-optic material is an electro-optic crystal selected from the group consisting of $LiNbO_3$, KTP, $LiTaO_3$, RTP, KDP, MD*P, BBO, $KnbO_3$, and $KTa_xNb_{1-x}O_3$.

21. The electro-optic device of claim 15, wherein said bulk electro-optic material is a bulk material selected from the group consisting of PNZ, PLZT, PMNN and PMN-PT.

22. The electro-optic apparatus of claim 15, wherein said lens is a non-uniform collimating lens.

23. The electro-optic device of claim 22 wherein the non-uniform collimating lens is a a free-space collimator lens in the shape of a rod.

24. A method for operating on a light beam by an electro-optic device comprising:
   a) providing a light beam;
   b) guiding the light beam to be incident against a lens;
   c) collimating said light beam to a non-uniform collimated beam having a cross sectional dimension that has a portion thereof that is equal to or less than a critical predetermined dimension within a working range WR, said working range being substantially twice the distance between said lens and said portion;
   d) positioning a bulk electro-optic material having a thickness τ within said working range WR; and
   e) performing an operation on said collimated beam by applying a drive voltage $V_{drive}$ to said bulk electro-optic material.

25. The method of claim 24, wherein the step of said performing an operation includes applying a drive voltage equal to or less than 400 V.

26. The method of claim 24, wherein the bulk electro-optic material includes positioning has a thickness is equal to or less than 300 μm.

27. The method of claim 24, wherein the step of providing light beam includes providing an interface between a ferrule and said lens.

28. The method of claim 27 wherein the step of providing the interface includes providing said interface polished at an angle equal to or less than 3 degrees from vertical.

* * * * *

UNITED STATES PATENT AND TRADEMARK OFFICE
CERTIFICATE OF CORRECTION

PATENT NO.       : 7,403,677 B1                                   Page 1 of 1
APPLICATION NO.  : 11/216434
DATED            : July 22, 2008
INVENTOR(S)      : Zhao et al.

It is certified that error appears in the above-identified patent and that said Letters Patent is hereby corrected as shown below:

In column 8, line 59 (claim 15) "retaining an said" should read -- retaining said --

In column 8, line 60 (claim 15) "disposed against adjacent" should read -- disposed adjacent --

In column 8, line 61 (claim 15) "lens to define form" should read -- lens to form --

In column 9, line 10 (claim 20) "MD*P" should read -- KD*P --

In column 9, line 13 (claim 21) "PMNN" should read -- PMN --

In column 9, line 17 (claim 23) "is a a free space" should read -- is a free space --

In column 10, line 15 (claim 26) "thickness is equal" should read -- thickness equal --

In column 10, line 18 (claim 27) "light beam" should read -- a light beam --

Signed and Sealed this

Seventh Day of October, 2008

JON W. DUDAS
*Director of the United States Patent and Trademark Office*